United States Patent
Mokdad et al.

(10) Patent No.: US 11,732,775 B2
(45) Date of Patent: Aug. 22, 2023

(54) CRANKSHAFT HAVING AT LEAST ONE COUNTERWEIGHT

(71) Applicant: Liebherr-Components Colmar SAS, Colmar (FR)

(72) Inventors: Bechir Mokdad, Jebsheim (FR); Yves-Antoine Rogard, Ribeauville (FR)

(73) Assignee: Liebherr-Components Colmar SAS, Colmar (FR)

( * ) Notice: Subject to any disclaimer, the term of this patent is extended or adjusted under 35 U.S.C. 154(b) by 0 days.

(21) Appl. No.: 17/649,769

(22) Filed: Feb. 2, 2022

(65) Prior Publication Data
US 2022/0243783 A1    Aug. 4, 2022

(30) Foreign Application Priority Data
Feb. 2, 2021    (DE) .................... 20 2021 100 494.0

(51) Int. Cl.
*F16F 15/28*    (2006.01)

(52) U.S. Cl.
CPC .................... *F16F 15/283* (2013.01)

(58) Field of Classification Search
CPC ............. F16F 15/283; F16F 2230/0041; F16C 2226/60; F16C 2360/22; F16C 3/20
USPC ...................................................... 123/192.2
See application file for complete search history.

(56) References Cited

U.S. PATENT DOCUMENTS

| | | | | |
|---|---|---|---|---|
| 1,803,317 A | * | 5/1931 | Brown | F16F 15/283 74/579 E |
| 2,838,941 A | | 6/1958 | Turlay | |
| 2005/0025651 A1 | | 2/2005 | Sowa et al. | |
| 2015/0276015 A1 | * | 10/2015 | Peterson | F16F 15/26 74/603 |
| 2016/0311303 A1 | | 10/2016 | Schuttenbach Von et al. | |

FOREIGN PATENT DOCUMENTS

| | | |
|---|---|---|
| CN | 205244107 U | 5/2016 |
| CN | 210739115 U | 6/2020 |
| CN | 111664161 A | 9/2020 |
| DE | 1111877 B | 7/1961 |
| DE | 1273900 B | 7/1968 |
| DE | 1283032 B | 11/1968 |
| DE | 1525018 A1 | 11/1969 |
| DE | 3919503 A1 | 12/1990 |
| DE | 102013203560 A1 | 9/2014 |
| EP | 1124066 A1 | 8/2001 |
| EP | 2772654 A2 | 9/2014 |
| EP | 3614018 A1 | 2/2020 |
| JP | S571846 A | 1/1982 |
| JP | 2005140337 A * | 6/2005 |
| KR | 20180022303 A * | 8/2016 |
| WO | 2008015532 A2 | 2/2008 |

\* cited by examiner

*Primary Examiner* — Yi-Kai Wang
(74) *Attorney, Agent, or Firm* — McCoy Russell LLP

(57) ABSTRACT

The present disclosure shows a crankshaft having at least one counterweight that is preferably screwed to the crankshaft via at least two screws, with the counterweight having a contact surface at which it contacts a counter-contact surface of the crankshaft. In this respect, the position of the counterweight at the crankshaft is fixed via at least one positioning element independent of the screw connection.

19 Claims, 7 Drawing Sheets

CRANKSHAFT HAVING AT LEAST ONE COUNTERWEIGHT

CROSS-REFERENCE TO RELATED APPLICATION

The present application claims priority to German Utility Model Patent Application No. 20 2021 100 494.0 filed on Feb. 2, 2021. The entire contents of the above-listed application is hereby incorporated by reference for all purposes.

TECHNICAL FIELD

The present disclosure relates to a crankshaft having at least one counterweight that is screwed to the crankshaft via at least two screws, with the counterweight having a contact surface at which it contacts a counter-contact surface of the crankshaft.

BACKGROUND

The counterweights arranged at the crankshaft serve to compensate the static or dynamic torques of the cranks. The mass of the counterweights should therefore be arranged as far as possible from the axis of the crankshaft to achieve balance torques that are possibly large with possibly small masses. However, the shape of the counterweights is limited by interfering contours formed by other components of the engine.

SUMMARY

On the one hand, the lower edge of the cylinders facing the crankshaft form such an interfering contour. It restricts the shape of the counterweights in that they have to be arranged at the crankshaft within a circular disk whose center is formed by the crankshaft and whose radius is defined by the spacing of the lower edge of the cylinders from the axis of the crankshaft On the other hand, however, if the lower edge of the piston reaches below the lower edge of the cylinder into the bottom dead center, said piston can also form an additional interfering contour. The spacing of this additional interfering contour from the axis of the crankshaft, however, depends on the angular position of the crankshaft since the piston moves upward again into the cylinder at a position before or after the dead center.

In many configurations, the counterweight is arranged at the crankweb such that the piston is directly above the center of the counterweight at its bottom dead center and represents the relevant interfering contour for it in its position reaching furthest downward. In a position of the piston before or after the dead center, in contrast, the counterweight is arranged with a point arranged next to its center directly below the piston so that the piston now forms the relevant interfering contour for this point at the outer periphery of the counterweight with its position there. Since the piston here has again been pushed a little into the cylinder, the interfering contour for this point at the outer periphery of the counterweight is therefore already further away from the axis of the crankshaft than at the center of the counterweight.

It was therefore already recognized at a very early point that the outer periphery of the counterweight, when the lower edge of the piston also represents a relevant interfering contour, does not have to extend circularly about the axis of the crankshaft to avoid the interfering contour, but can rather have a distance from the axis of the crankshaft that becomes bigger and bigger starting from a center of the counterweight. If this effect is utilized, the mass of the counterweight can be arranged as far away from the axis as possible without colliding with an interfering contour.

U.S. Pat. No. 2,838,941, a document from 1953, for instance, uses an outer shape of the counterweight that is not circular. The document here teaches using an outer contour of the counterweight that is constituted such that the spacing between the piston and the outer contour remains substantially constant when the counterweight passes the piston. The outer contour here therefore extends to the same degree further away from the axis of the crankshaft as the piston again moves away from the counterweight so that it has exceeded the bottom dead center.

Document JP 570 01 846 A from 1982 is based on the same idea as U.S. Pat. No. 2,838,941, but describes a situation in which the piston represents the relevant constraint for a central part of the periphery of the counterweight, while the crankcase forms the interfering contour for the lateral regions. A flattened central section is therefore used for which the piston is the relative constraint and circular side sections whose center is located on the axis of rotation of the crankshaft and for which the housing represents the constraint.

Document EP 1 124 066 A1 from 2001 substantially describes the same disclosure as U.S. Pat. No. 2,838,941.

WO 2008/015532 A2, a document from 2006, again describes the same disclosure as U.S. Pat. No. 2,838,941. It in this respect discusses the restrictions resulting from the different interfering contours in detail and describes different shapes for the outer periphery of the counterweights that are only constrained in that they have to be within a region defined by all the relevant interfering contours. A counterweight having a partial arcuate outer periphery is thus described, for example, whose center point is arranged on a line between the axis of the crankshaft and the axis of the crankpin. A further embodiment is furthermore described in which the outer periphery substantially follows a line that is defined by a constant spacing from the piston and hereby forms an ellipse.

Documents EP 2 772 654 B1 and DE 10 2013 203 560 B4 likewise show corresponding counterweights, with EP 2 772 654 B1 being directed to an embodiment in accordance with the first above-mentioned embodiment of WO 2008/015532 A2 and DE 10 2013 203 560 B4 being directed to an embodiment in accordance with the second above-mentioned embodiment of WO 2008/015532 A2.

It must be pointed out here that the axis of the crankshaft in U.S. Pat. No. 2,838,941 is arranged beside a plane defined by the center axis of the cylinders, as is provided in part with V engines. The counterweight is hereby also not arranged symmetrically with respect to the plane defined by the axis of the crankpin and the crankshaft, but rather rotated by an angular offset with respect thereto. In the other documents, the counterweight is, in contrast arranged symmetrically with respect to the plane defined by the axis of the crankpin and the crankshaft. This difference is, however, of no importance for the embodiment of the counterweight.

The above-discussed documents each show counterweights forged in one piece with the crankshaft. However, nothing different applies to the counterweights screwed to the crankshaft since the geometrical constraints are the same as for forged counterweights. The only difference with screwed counterweights therefore comprises the fact that one or more cutouts for the heads of the screws by which the respective counterweight is screwed to the crankshaft are provided at the outer periphery within the convexly curved region.

Such a counterweight is shown in FIG. 1. It in this respect has an outer periphery in whose center region a cutout is provided for the heads of the two screws by which the counterweight is screwed to the crankshaft. A first partial arcuate region adjoins both sides of the cutout and its center is arranged on a line between the axis of the crankshaft and the axis of the crankpin, as is known from the first above-named embodiment, of WO 2008/015532 A2. Respective second partial arcuate regions then adjoin outwardly whose radius is considerably smaller, with the center of these partial arcuate regions each being arranged in a region between the axis of the crankshaft and the outer periphery of the counterweight and amounting to approximately half of the spacing of the outer periphery from the axis of the crankshaft.

As shown in the upper illustration in FIG. 2, an elevated portion that could in principle extend up to the radius of the first partial arcuate region, but that extends less far to the outside in the embodiment, can be provided between the two screws within the cutout for the heads of the two screws in an alternative embodiment. The alternative embodiment corresponds in FIG. 2 to two otherwise identical embodiments that are described with respect to FIG. 1 and is shown again at the bottom in FIG. 2 for comparison.

Different counterweights can furthermore also be arranged at a crankshaft, for example both screwed counterweights in accordance with the top illustration in FIG. 2 and screwed counterweights in accordance with the bottom illustration in FIG. 2. A screwed counterweight in accordance with the upper illustration in FIG. 2 can, for example, be provided for one or both crankwebs of a center crank of the crankshaft and a screwed counterweight in accordance with the bottom illustration in FIG. 2 can be provided for the other crankwebs.

A crankshaft is known from document EP 3 614 018 A1. The screwed counterweights described in this document, however, are respectively arranged at the associated crankweb with a different angular offset from a position with respect to the respective crankpin or with respect to the piston. In order nevertheless to be able to use the same raw part for all the screwed counterweights, the outer periphery of the screwed counterweights used there therefore has the shape of an arcuate section whose center coincides with the axis of the crankshaft. The document furthermore also uses forged counterweights at the same crankshaft that are likewise arranged at the associated crankweb with a different angular offset from a position with respect to the respective crankpin or with respect to the piston. The outer periphery of these counterweights, however, respectively has a radius of curvature that is smaller than the spacing of the outer periphery from the axis of the crankshaft.

The factors that determine the shape of the outer section of the counterweight and the embodiments possible for this shape have therefore long been very well known both for counterweights screwed to the crankshaft and for forged counterweights.

The factors that play a role for the connection of screwed counterweights to the crankshaft have to date found less consideration.

FIG. 3 here, for example, shows the embodiment of the contact surface of a counterweight in accordance with the embodiments in FIGS. 1 and 2 at which they contact a counter-contact surface of the crankshaft. In this respect, a contiguous contact surface is provided that surrounds the two bores for the screws. The bores here each have centering bushes in their lower regions through which the counterweights are positioned in the correct position at the crankshaft.

It is the object of the present disclosure to improve the connection of screwed counterweights to the crankshaft.

The present disclosure comprises a crankshaft having at least one counterweight that is screwed to the crankshaft, with the counterweight having a contact surface at which it contacts a counter-contact surface of the crankshaft. Provision is made in this respect that the position of the counterweight at the crankshaft is fixed via at least one positioning element independent of the screw connection.

This embodiment permits a better positioning of the counterweights at the crankshaft since the bores for the screws now no longer have to have a dual function. The positioning rather takes place via the positioning element independent of the screw connection.

The screw connection of the counterweight to the crankshaft may take place via at least two screws.

In a possible embodiment of the present disclosure, the positioning element can be at least one positioning pin and an associated positioning cutout in which said positioning pin engages.

In a possible embodiment of the present disclosure, the positioning elements are provided spaced apart from the at least one screw connection. The positioning pin or pins and/or positioning cutouts are in particular spaced apart from the screws and/or bores for the screws. The positioning element or elements in particular have a spacing from the elements of the screw connection, in particular from the screw or screws and/or bores for the screws in the plane defined by the contact surface.

In a possible embodiment of the present disclosure, at least two positioning elements, in particular at least two positioning pins and associated positioning cutouts, are provided.

In a possible embodiment of the present disclosure, the positioning cutout or cutouts is/are bores.

In a possible embodiment of the present disclosure, the longitudinal axis of the at least one positioning element, in particular of the at least one positioning pin and the associated positioning cutout, extends in parallel with the axis of at least one screw connection and/or perpendicular to the contact surface.

Provision is made in a possible embodiment of the present disclosure that the positioning pin or pins engages/engage in positioning cutouts, in particular bores, that are aligned with one another in the counterweight and in the crankshaft or crankweb.

In a possible embodiment of the present disclosure, the positioning pin or pins is/are pressed into the positioning cutout. The positioning pin or pins may be pressed into positioning cutouts of the counterweight and of the crankshaft or crankweb that are aligned with one another.

The tolerances for the positioning pins and the positioning cutouts can be selected such that the positioning pins fit exactly into the positioning cutouts and are held therein by a press fit.

Provision is made in a possible embodiment of the present disclosure that a first positioning element, in particular a first positioning pin, is arranged in a center plane of the counterweight extending perpendicular to the axis of the crankshaft and/or in a screw connection plane of the counterweight spanned by the longitudinal axes of two screws.

Provision is made in a possible embodiment of the present disclosure that a second positioning element, in particular a second positioning pin, is arranged axially next to a center plane of the counterweight extending perpendicular to the axis of the crankshaft and/or a screw connection plane of the counterweight spanned by the longitudinal axes of two screws.

In a possible embodiment of the present disclosure, a first positioning element and a second positioning element have a different spacing from a screw connection plane of the counterweight extending perpendicular to the axis of the crankshaft and spanned by the longitudinal axes of two screws and/or from a center plane extending in parallel with the axis of the crankshaft at the same spacing centrally between the longitudinal axes of two screws.

Provision is made in a possible embodiment of the present disclosure that the positioning element or elements, in particular positioning pins and/or the positioning cutout or cutouts, is/are arranged within the counter-contact surface or contact surface. The positioning bores can in particular be arranged spaced apart from the bores of the screws in the counter-contact surface or contact surface.

Provision is made in a possible embodiment of the present disclosure that the positioning elements, in particular positioning pins and/or the positioning cutouts, are associated with a respective screw.

Provision is made in a possible embodiment of the present disclosure that the positioning elements, in particular positioning pins and/or positioning cutouts, are arranged spaced further apart from one another than the screws and respectively outwardly beside the screws with respect to the peripheral direction.

The present disclosure in a second aspect comprises a crankshaft having at least one counterweight that is screwed to the crankshaft via at least two screws, with the counterweight having a contact surface at which it contacts a counter-contact surface of the crankshaft. In this respect, the contact surface has at least two mutually separate contact regions that are each associated with one of the two screws.

The inventors of the present disclosure have recognized that the separate contact regions can substantially improve the force distribution over the contact surface.

Provision is made in a possible embodiment of the present disclosure that the contact regions each surround one of the two screws at least in part and, in some instances, completely.

Provision is made in a possible embodiment of the present disclosure that the screws are respectively substantially arranged at the center of one of the contact regions.

Provision is made in a possible embodiment of the present disclosure that the contact regions extend in a common plane.

Provision is made in a possible embodiment of the present disclosure that the contact regions are arranged symmetrically with respect to a center plane of the counterweight extending in the axial direction of the crankshaft.

Provision is made in a possible embodiment of the present disclosure that the contact regions have a substantially quadratic shape.

Provision is made in a possible embodiment of the present disclosure that the widths of the contact regions substantially corresponds to their lengths.

Provision is made in a possible embodiment of the present disclosure that the contact regions extend over the total axial width of the counterweight.

The first and second aspects are also subjects of the present disclosure independently of one another.

A counterweight in accordance with the second aspect that has separate contact regions associated with the respective screws can thus, for example, be designed without a separate positioning element in accordance with the first aspect and can, for example, be positioned via a centering bushing integrated in the bore for the screws such as was described above with respect to the prior art.

A counterweight in accordance with the first aspect that is positioned via a separate positioning element can furthermore have a contiguous contact surface for the at least two screws and, in some embodiments, all of the screws.

The first and second aspects, however, can be used in combination.

Provision is in particular made in a possible embodiment of the present disclosure, that the positioning elements, in particular positioning pins or positioning cutouts, are each associated with one of the contact regions into which the contact surface is divided and can be arranged therein.

In accordance with a further aspect, the present disclosure comprises a crankshaft having at least one counterweight, with the counterweight having a contact surface at which it contacts a counter-contact surface of the crankshaft, two screws by means of which the counterweight is screwed to the crankshaft, and two positioning elements that are spaced apart from the screws and by means of which the position of the counterweight at the crankshaft is fixed, with the spacing between the two positioning elements being greater than the spacing between the two screws.

The crankshaft in accordance with the further aspect can be designed such as it was already described above with respect to the first and/or second aspects.

Certain embodiments of the present disclosure that can be used in any of the above-described aspects will be described in more detail in the following.

Provision is made in a possible embodiment of the present disclosure that the contact surface is produced by cutting machining of a raw part, with the raw part, for instance, being a casting or a forged part.

Provision is made in a possible embodiment of the present disclosure that the contact surface extends in a plane that extends in parallel with the axis of the crankshaft and/or perpendicular on a center plane of the counterweight extending in an axial direction of the crankshaft.

The present disclosure can in particular be used with counterweights having a shape of the outer periphery such as was described above with respect to the prior art.

Provision is therefore made in a possible embodiment of the present disclosure that the outer periphery of the counterweight may have at least one convexly curved section, with the convexly curved section extending symmetrically on both sides of a center plane of the counterweight extending in the axial direction of the counterweight.

Provision is made in a possible embodiment of the present disclosure that the spacing of the outer periphery of the counterweight from the axis of the crankshaft in the region of the convexly curved section may increase outwardly from a center plane of the counterweight extending in the axial direction of the crankshaft, with the convexly curved section having a center that is arranged on the side disposed opposite the counterweight with respect to the axis of the crankshaft.

Provision is made in a possible embodiment of the present disclosure that one or more cutouts for the screw heads are provided within the convexly curved section, such as, with the cutout or cutouts extending over the total axial width of the counterweight.

Provision is made in a possible embodiment of the present disclosure that the radius of curvature of the convexly curved section becomes outwardly smaller from a center plane of the counterweight extending in the axial direction of the crankshaft, with the convexly curved section having at least one section having a constant radius of curvature on both sides of the center plane, with the convexly curved section being composed of at least two sections having a constant radius of curvature on both sides of the center plane, with the radii of curvature of the sections decreasing in size toward the outside.

Provision is made in a possible embodiment of the present disclosure that on its side facing the axis of the crankshaft, the counterweight has material regions that extend on the side facing the axis of a plane defined by the contact surface.

Provision is made in a possible embodiment of the present disclosure that the longitudinal axis of the screws is perpendicular to the contact surface and/or with the longitudinal axes of the screws extending in parallel with one another.

Provision is made in a possible embodiment of the present disclosure that the counterweight is arranged via the screw connection rigidly at the crankshaft and/or is designed as a single-piece component.

Provision is made in a possible embodiment of the present disclosure that the counterweight is screwed to a crankweb, with the counterweight being disposed radially opposite a crankpin arranged at the crankweb.

Provision is made in a possible embodiment of the present disclosure that the crankshaft has a plurality of cranks and/or crankwebs that are associated with counterweights.

Provision is made in a possible embodiment of the present disclosure that the crankshaft also has counterweights produced, such as forged, in one piece with the crankshaft in addition to screwed counterweights.

In a possible embodiment, the crankshaft in accordance with the disclosure is a crankshaft for an internal combustion engine having at least 12 cylinders and/or for a V engine.

The present disclosure furthermore comprises a counterweight for a crankshaft such as was described above.

In this respect, the contact surface in accordance with the first aspect has at least two mutually separate contact regions that are each associated with one of the two screws.

Alternatively or additionally in accordance with the second aspect, the position of the counterweight at the crankshaft is fixed via at least one positioning element independent of the screw connection. The counterweight can in particular have a positioning pin or a positioning cutout. The at least one positioning element can furthermore be provided spaced apart from the at least one screw connection. A positioning cutout can in particular be provided separately from a bore for a screw.

The counterweight may be designed such as was described above with respect to the crankshaft.

The present disclosure furthermore comprises an internal combustion engine having a crankshaft such as was described above.

It is in particular an internal combustion engine having at least 12 cylinders and/or a V engine.

The present disclosure further comprises a machine having an internal combustion engine such as was described above.

It can in particular be a mobile machine, in particular an earth-moving machine such as an excavator or dumper truck, a ship, or a railroad.

Alternatively, it can be a stationary machine, in particular a generator unit for generating electrical energy.

BRIEF DESCRIPTION OF THE FIGURES

The present disclosure will now be described in more detail with reference to embodiments and to drawings.

There are shown.

DETAILED DESCRIPTION

Figure 1:
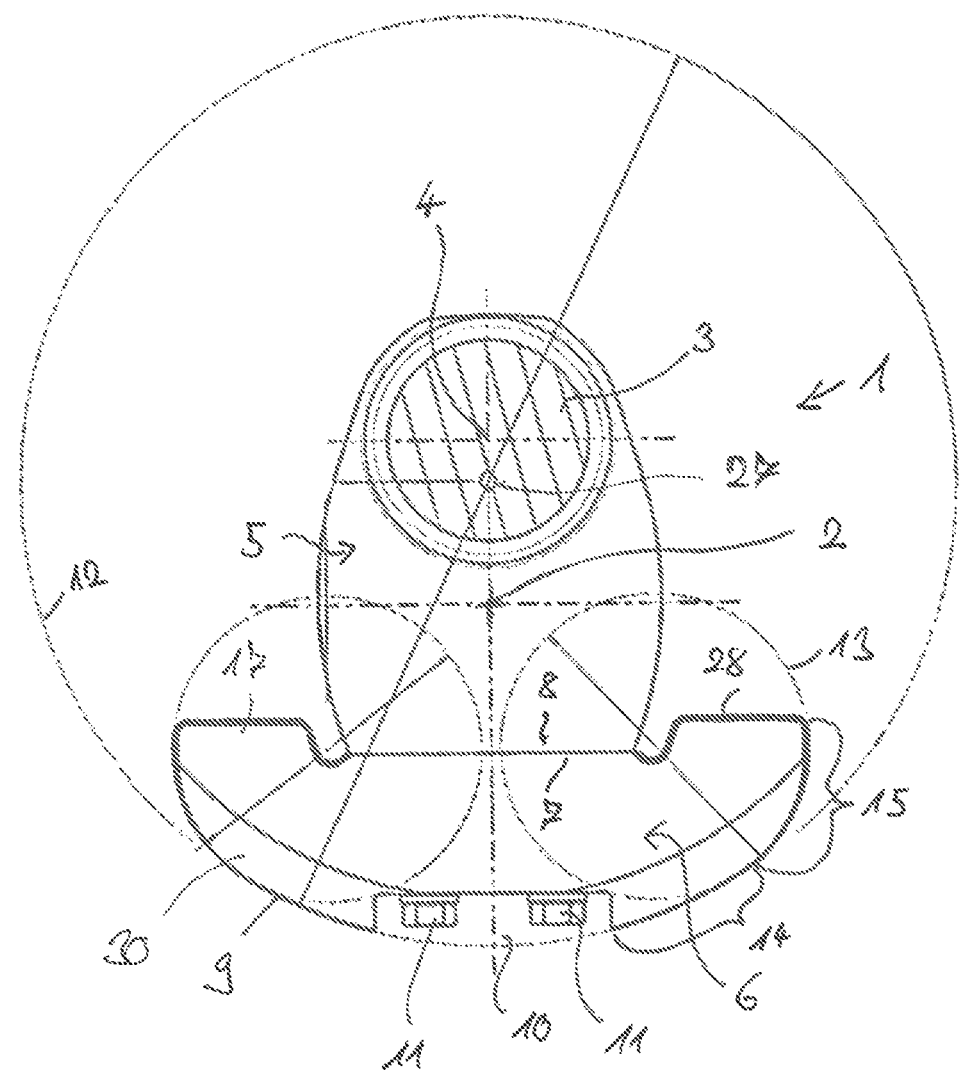
FIG. 1: an embodiment of a crankshaft having at least one counterweight in a view from an axial direction.

FIG. 1 shows an embodiment of a crankshaft 1 having a counterweight 6.

The embodiment of the crankshaft shown in FIG. 1 and described in more detail in the following is used both with crankshafts in accordance with the prior art and with crankshafts in accordance with the present disclosure and is therefore shown in common for both embodiments in the following.

The crankshaft 1 has main bearing regions that are not shown in more detail in FIG. 1 and via which the crankshaft is supported at main bearings of the engine rotatable about the axis 2. Such main bearing regions are here provided between all the cranks of the crankshaft and at the two outer ends of the crankshaft.

The crankshaft 11 further comprises crankpins 3 at which connection rods are supported via which the crankshaft is connected to pistons of the internal combustion engine. The crankpins 3 here respectively extend between crankwebs 5 of the crankshaft that connect the crankpins 3 to the main bearing regions. The axis of the crankpins 3 is marked by "4" and here represents the axis of rotation about which the connecting rods rotate.

Counterweights 6 are furthermore provided at the crankshaft that may be arranged at the crankwebs 5. Only one single crankweb having a counterweight 6 arranged thereon is shown in FIG. 1 in this respect.

In the possible embodiment, every crankweb 5 can have a counterweight 6. Alternatively, also only individual crankwebs can have counterweights 6 such as described in more detail in the following, while other crankwebs either have no counterweights at all or have differently designed counterweights, for example counterweights produced, for example forged, in one piece with the crankshaft.

The counterweight 6 is screwed to the crankshaft via screws 11. The counterweight 6 here has a contact surface 7 at which it contacts a counter-bearing surface 8. The contact surface 7 and the contact surface 8 are pressed with one another via the screws 11.

In the embodiment, the counter-contact surface 8 is arranged at the crankweb 5. The counterweight 6 is hereby screwed to the crankweb 5. In this respect, bores 17 not shown in FIG. 2 pass through the counterweight 6. The screws 11 extend through these bores through the counterweight to the crankshaft 5. The crankwebs have corresponding threaded bores in which the screws 11 are screwed. The screw heads lie on an outer peripheral surface of the counterweight 6.

In the embodiment, a plurality of screws 11 are provided whose longitudinal axes are arranged in parallel with one another. Two screws 11 are specifically used in the embodiment.

The counterweight has mirror symmetry with respect to a plane of symmetry extending in the axial direction. The contact surface 7 and the counter-contact surface 8 here are perpendicular on this plane.

The counterweight is arranged at the crankshaft such that the axis 2 of the crankshaft extends in the plane of symmetry.

In the embodiment, the counterweight 6 is arranged without any angular offset on the side of the crankweb 5 disposed opposite the crankpin 3, that is the plane of symmetry of the counterweight 6 is a plane that is spanned by the axis 2 of the crankshaft and the axis 4 of the crankpin 3.

The outer periphery of the counterweight 6 has a centrally arranged cutout 10 in whose base region the bores 17 for the screws are arranged, with the heads of the screws being supported on the base region of the cutout surrounding the bores 17.

The outer periphery of the counterweight 6 furthermore has convexly curved sections 14 and 15 that extend at both sides of the cutout 10 for the screws 11. In a first curved region 14 adjoining the cutout 10, the outer periphery has a radius of curvature 12 whose center 27 lies on the connection line between the axis 2 of the crankshaft and the axis 4 of the crankpin 3.

In the embodiment, the center 27 is here closer to the axis 4 of the crankpin and divides the distance between the axis 4 of the crankpin 3 and the axis 2 of the crankshaft 1 in a ratio of approximately 1:3.

The two first regions 14 each extend over an angular range with respect to the axis 2 of the crankshaft between 10 and 40 degrees, such as between 15 and 30 degrees. In the embodiment, the two first regions extend approximately between an angle of 20 degrees, measured from the center line or the plane of symmetry of the counterweight, up to an angle of approximately 43 degrees with respect to the axis 2 of the crankshaft.

A respective second convexly curved region 15 having a smaller radius of curvature 13 adjoins the first convexly curved region 14. The radius in the second region 15 only amounts to approximately one third of the radius in the first region 14.

The second convexly curved regions 15 form the outer end of the outer peripheral surface of the counterweight. Here, they merge with a small radius of curvature into regions of the inner peripheral surface of the counterweight that extend outwardly from the contact surface.

The counterweight 6 has material regions 17 at both sides of the contact surface 7 that are arranged on the side of the axis 2 defined with respect to the plane defined by the contact surface 7, that is arranged closer to the axis 2 than to the plane of the contact surface 7. These material regions 17 have termination surfaces 28 that extend inwardly in each case in parallel with the contact surface 7 from the outer end of the second section 15 and are connected to the contact surface 7 at their inner ends via bent sections.

The counterweight 6 thus has a mushroom-like shape together with the crankweb 5 at which it is arranged.

Figures 2A, 2B:
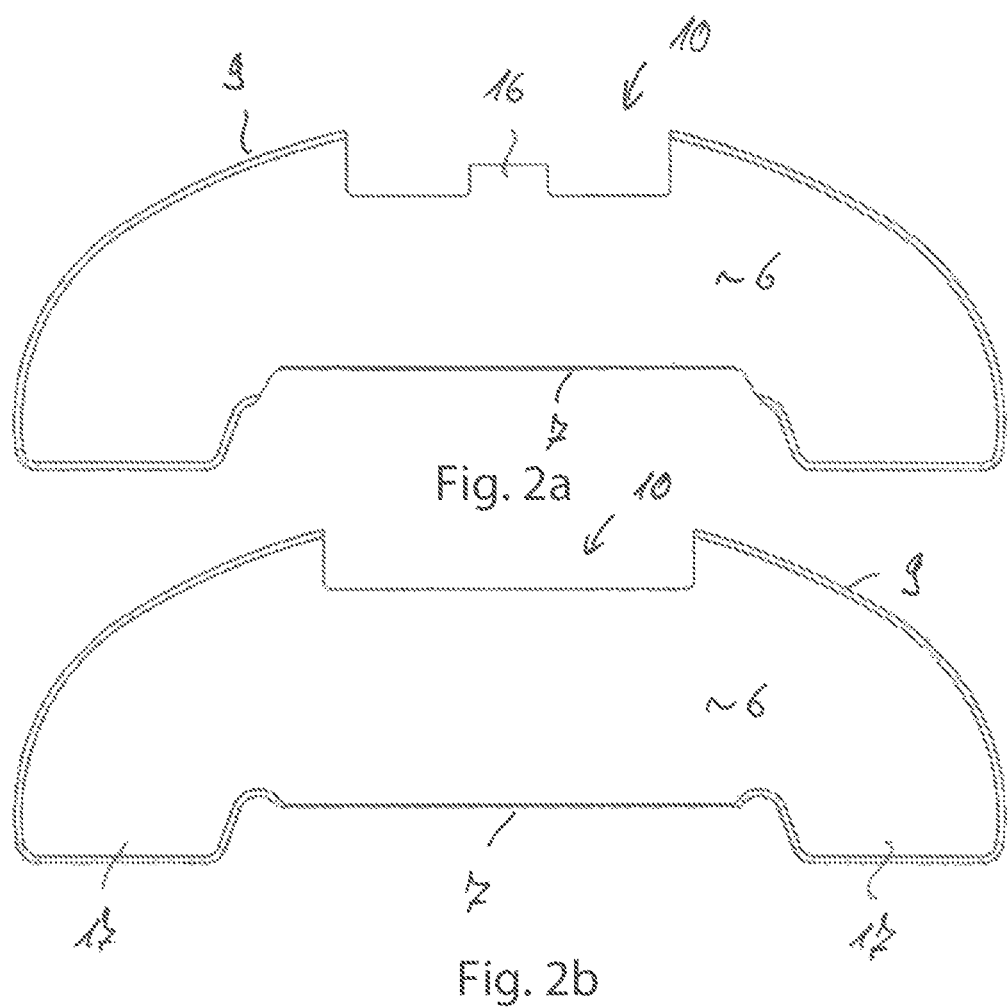
FIGS. 2a and 2b: two embodiments of counterweights.

Two different embodiments for counterweights 6 are shown in FIGS. 2a and 2b that only differ with respect to the cutout 10 for the screws 11. They otherwise correspond to the counterweights described with respect to FIG. 1.

The counterweight shown in FIG. 2b here corresponds to the counterweight shown in FIG. 1 and has a single continuous cutout in a base region extending in parallel with the contact surface 7. In the embodiment shown in FIG. 2a, in contrast, an elevated portion 16 is provided between the regions for the two screws 11. It could in principle reach up to the radius 12. However, it remains below the radius in the embodiment.

In a possible embodiment, both counterweights in accordance with FIG. 2a and counterweights in accordance with FIG. 2b can be arranged at a single crankshaft. The cranks arranged centrally at the crankshaft can have counterweights in accordance with FIG. 2a, all the other cranks can have counterweights in accordance with FIG. 2b. Other mixes and embodiments are, however, also conceivable.

In all the embodiments, the cutout 10 extends over the total axial width of the counterweight. The screw heads of the screws 11 are hereby axially accessible. With wider counterweights, it would, however, also be conceivable that the cutout 10 or the corresponding cutouts for the screw heads are cutouts that do not extend over the total axial width of the counterweight, but are rather, for example, let into the then continuous curved region in the form of blind holes.

The counterweight is here substantially of plate shape, with the main plane of the counterweight being perpendicular to the axis of the crankshaft.

Figure 3A:
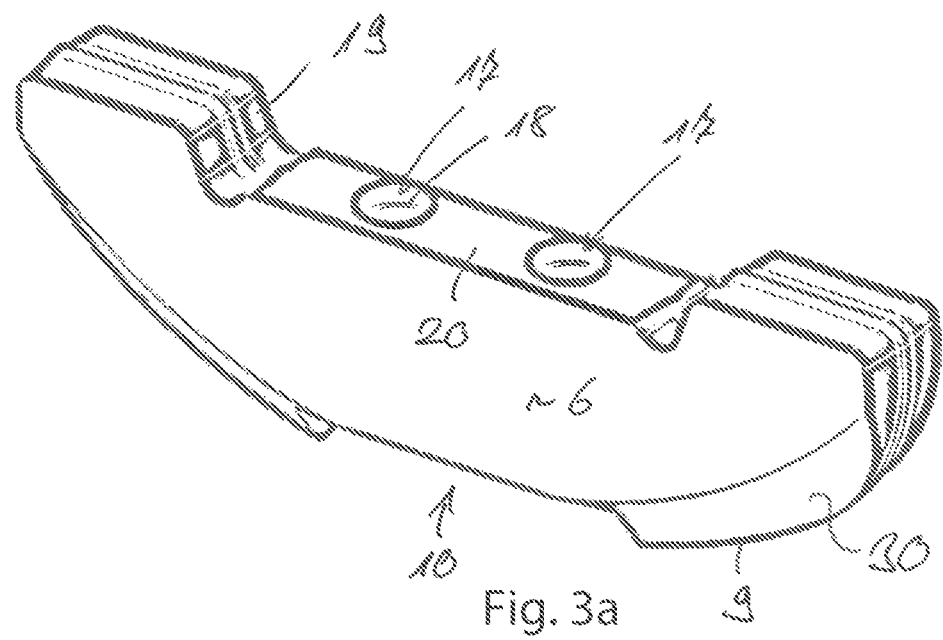
FIG. 3a to FIG. 3c: an embodiment of a counterweight in accordance with the prior art.
Figure 3B:
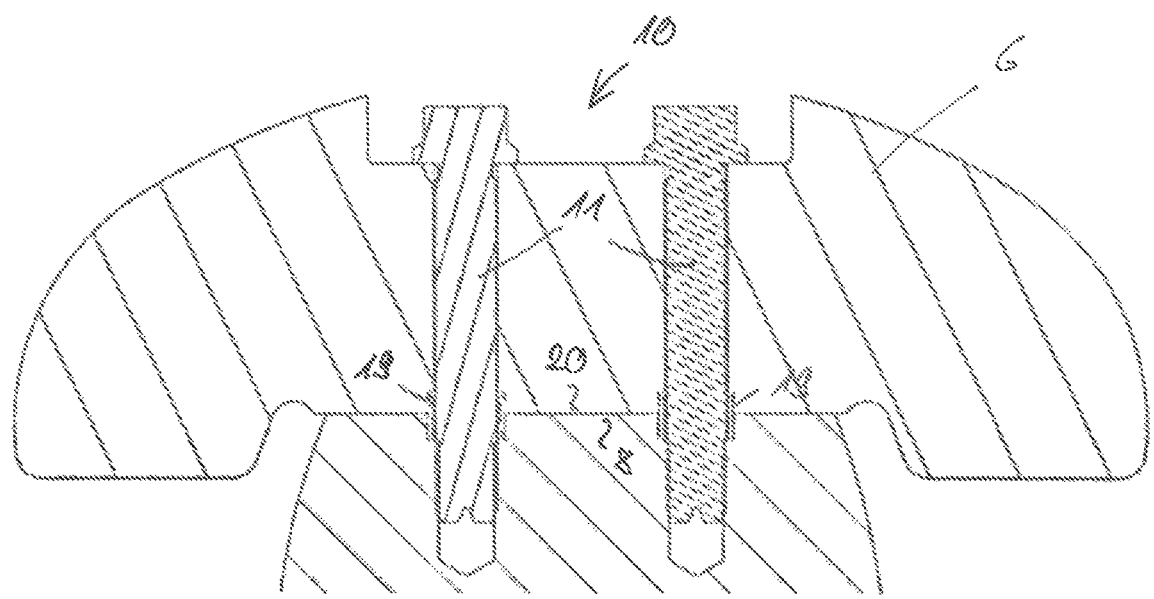
Figure 3C:
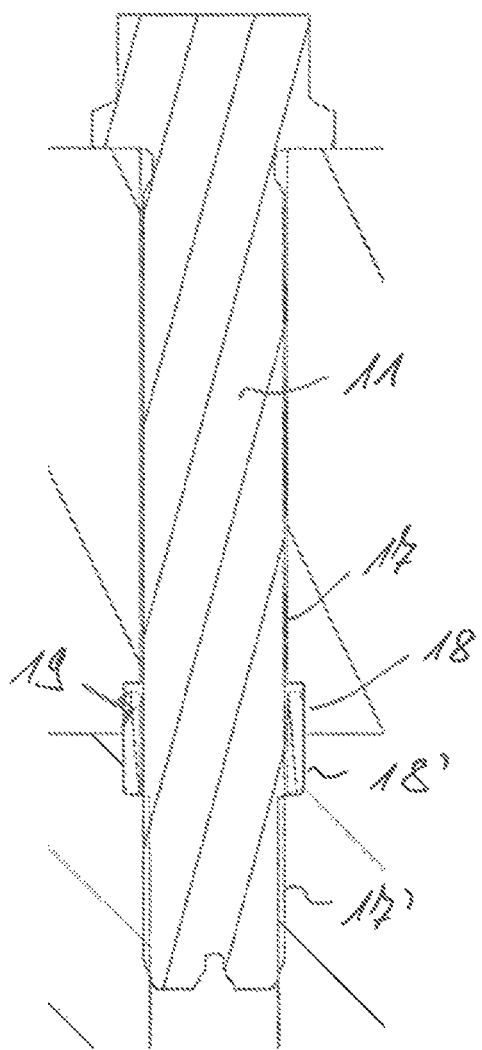

As can in particular be seen from FIG. 3a, the counterweight, however, has lateral chamfers 30 in the region of its convexly curved periphery 9. They serve to avoid collisions with components of the engine, the connecting rod, the piston, or the cylinder.

The embodiment of the crankshaft and of the counterweight shown in FIGS. 1 and 2 is initially known. As presented in detail in the general part of the description, the shape of the counterweight and in particular the shape of the convex peripheral region of the counterweight serve to position as much material and thus mass as possible as far away as possible from the axis 2 of the crankshaft without thus colliding with interfering contours. The radius of the section 14 can here be greater than the spacing of the axis 2 from the crankshaft because the relative interfering contour in this region is formed by the piston that, however, does not represent a fixed interfering contour, but is in turn moved into the cylinder again after reaching the bottom dead center and therefore permits a shape of the counterweight in which the radius is greater in the region 14 than the spacing from the crankshaft 2.

The present disclosure therefore does not deal with these very well-known aspects of the design of a crankshaft, but rather with the specific connection between the counterweight and the crankshaft. This configuration in accordance with the disclosure of this connection can therefore be used independently of the shape of the counterweight with all the counterweights screwed to the crankshaft.

The connection to the crankshaft is shown in FIGS. 3 to 6 for an embodiment of a counterweight in accordance with the prior art. It has a single contiguous contact surface 20 within which the two bores 17 for the screws are provided.

Extended sections 18 into which first ends of centering sleeves 19 engage to position the counterweights at the crankshaft are provided to center the counterweight in this respect in the lower end section of the bores 17 facing the crankshaft.

The crankshaft likewise has a contiguous counter-contact surface 8 that is pressed with the contact surface 20.

Bores 17' into which the screws 17 are screwed and that are aligned with the bores 17 of the counterweight are provided in the counter-contact surface 8 of the crankshaft or the crankweb. The end sections 17' facing the counterweight 17 have extended sections 18' that are aligned with the extended sections 18 of the counterweight and into which the other ends of the centering sleeves engage.

The outer peripheries of the centering sleeves 19 are pressed into the extended sections 18 and 18'. They surround the screws 11, with a gap remaining between their inner peripheries and the outer peripheries.

Figure 4:
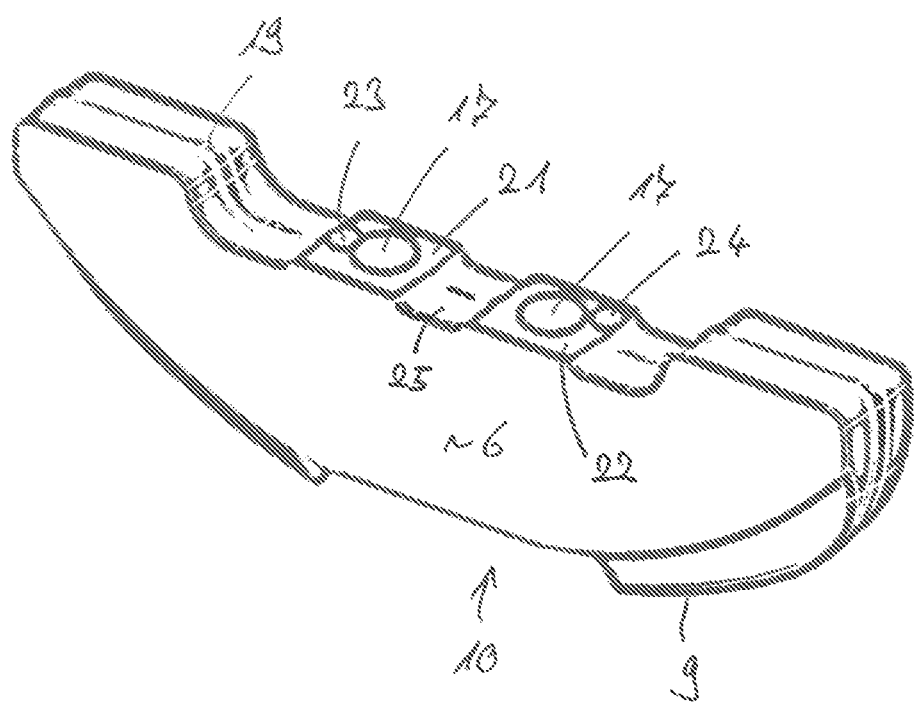
FIG. 4: an embodiment of a counterweight in accordance with the disclosure.
Figure 5:
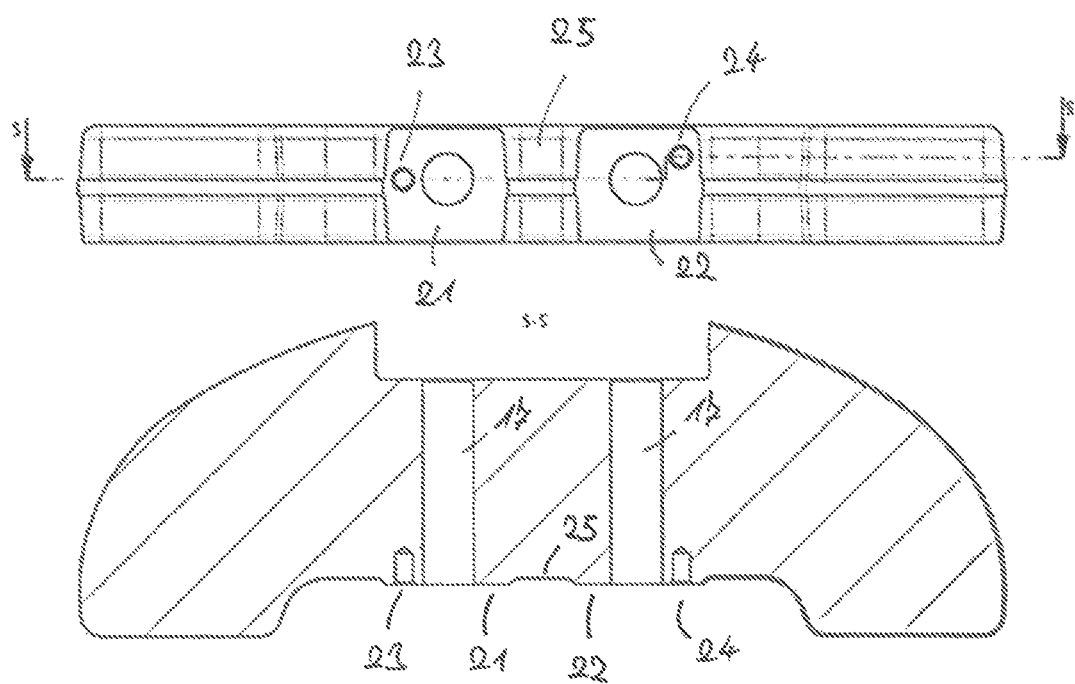
FIG. 5: the embodiment of FIG. 4 in a view from below and from the side.
Figure 6:
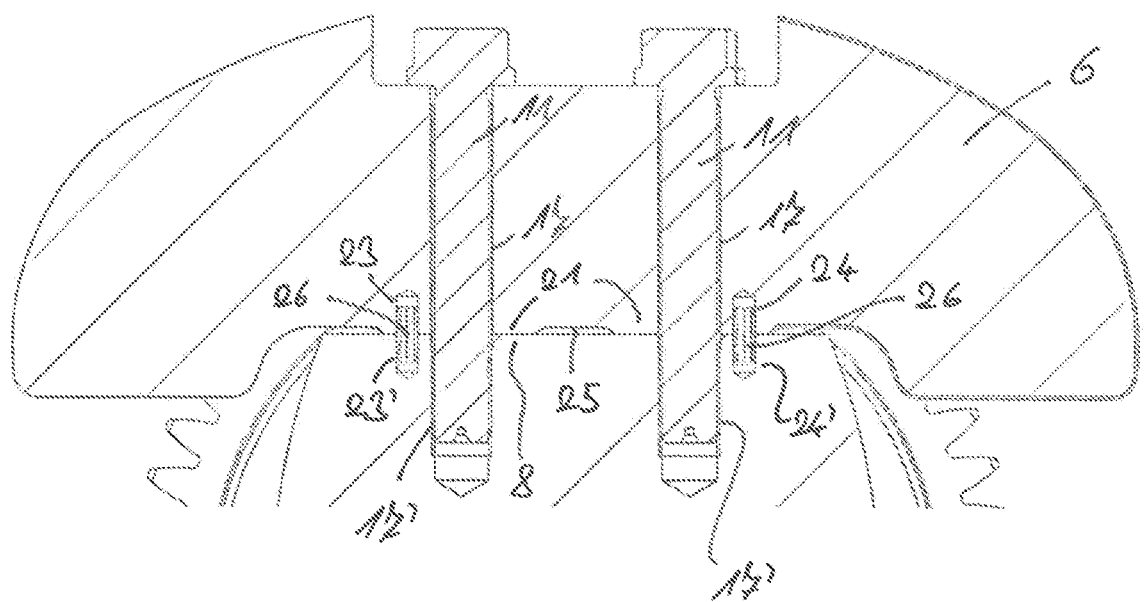
FIG. 6: a detail view of the embodiment of FIGS. 4 and 5.

An embodiment of a connection in accordance with the disclosure to the crankshaft is shown in FIGS. 4 to 6 in contrast.

In accordance with a first aspect of the present disclosure, the contact surface 20 is split in accordance with the disclosure into two contact regions 21 and 22 that are separate from one another and that are each associated with one of the bores 17 for the screws. The first contact region 21 is therefore in particular associated with the one screw, the second contact region 22 with the other screw.

The contact regions 21 and 22 in particular each surround one of the bores 17. A region 25 in which the counterweight does not lie on the counter-contact surface is provided between the two contact regions 21 and 22.

In the embodiment, the counterweight is designed as a casting and/or as a forged part. The contact regions 21 and 22 are produced in a cutting process. Cast marks 19 of the mold can be recognized in the Figures here.

The contact regions 21 and 22 have an approximately quadratic basic shape at whose center the respective bore 17 is arranged. A substantially more concentrated force transmission between the counterweight and the crankshaft or the crankweb, by which a canting and inaccuracies in the placement are avoided, is hereby produced in comparison with the contiguous substantially larger contact surface 20 in accordance with the prior art.

In the embodiment, the two contact regions 21 and 22 extend over the total axial width of the counterweight and can hereby be produced relatively simple by a cutting machining of this region of the counterweight. The raw part therefore has a raised region whose height is reduced by the cutting machining, but is not reduced to zero, in the region of the contact regions 21 and 22 in comparison with the interposed region 25 and in comparison with the outwardly disposed regions.

The counter-contact surface 8 at the crankshaft or crankweb is furthermore produced as contagious in the embodiment, but could likewise have two separate regions that would correspond to the two contact regions 21 and 22.

In accordance with a second aspect of the present disclosure, the positioning of the counterweights at the crankshaft or crankweb takes place via positioning bores 23 and 24 that are provided separately from the bores 17 for the screw connections in the counterweight.

Positioning pins 26 that position the counterweights at the crankshaft or crankweb engage into the bores 23 and 24.

The axes of the positioning bore 23 and 24 or positioning pins 26 extend in parallel with the axes of the bores 17 for the screw connection.

In the embodiment, a first positioning bore 23 is arranged in a plane that is defined by the center axes of the two bores 17 for the screw connections. The second positioning bore 24 is in contrast laterally displaced with respect to this plane. The plane defined by the two bores 17 can here form a center plane of the counterweight in the axial direction can, however, also be slightly displaced with respect to such a center plane.

The positioning bores 23 and 24 and the corresponding positioning elements 26 are disposed further apart than the bores 17 for the screw connections. They are in particular each disposed laterally next to the bores 17 for the screw connections in the peripheral direction.

Bores 17' into which the screws 17 are screwed and that are aligned with the bores 17 of the counterweight are provided in the counter-contact surface 8 of the crankshaft or the crankweb.

Positioning bores 23' and 24' are furthermore provided in the counter-contact surface 8 that are aligned with the positioning ores 23 and 24 of the counterweight and into which the positioning pins 26 engage. The positioning bores 23' and 24' are thus likewise provided separately from the bores 17' for the screw connection and are spaced apart therefrom.

The outer peripheries of the positioning pins are pressed into the positioning bores 23, 23' and 24, 24'. In the embodiment, the positioning pins 26 are solid, circular cylindrical elements.

The three aspects of the present disclosure can also be used independently of one another. The separate contact regions could in particular also be used with a positioning via positioning sleeves such as are known from the prior art. The positioning elements in accordance with the second aspect could furthermore also be used in a contiguous contact surface such as was used in the prior art. The positioning elements could in particular be arranged within such a contiguous contact surface and the positioning bores could in particular be introduced into them.

Both aspects, however, may be combined such as is also the case in the embodiment.

In the embodiment, the positioning bores are each introduced into the contact regions 21 and 22 and are therefore each surrounded thereby. The positioning bore 23 is here specifically arranged in the region of the contact region 21, the positioning bore 24 in the region of the contact region 22. In other words, the one bore 17 for one of the two screw connections and the positioning bore 23 are arranged in the region of the contact region 21 and the other bore 17 for the other screw connection and the second positioning bore 24 are arranged in the region of the contact region 22. The positioning pins that engage into the positioning bores are arranged in the region of the counter-contact surface.

As described above, the positions of the positioning bores and positioning pins can be swapped over in an alternative embodiment with respect to the embodiment shown.

The bores 17 pass as described above through the counterweight such that the screw heads lie in the region of the cutout 10 and the counterweight is rigidly connected to the crankshaft by the screws passing through the counterweight.

The positioning bores 23, 23' and 24, 24' in contrast are blind holes in the embodiment. The bores 17' for the screws in the crankshaft or crankweb are equally designed as blind holes.

In a possible embodiment of the present disclosure, the counterweights and the crankshaft can be designed according to scale as is shown in the drawings. All the geometrical ratios that are shown in the Figures can therefore be implemented in exactly the form shown. The radii of curvature and the specific shapes can here in particular also be implemented in exactly its form as shown in the Figures. The same applies to the relative positioning and size of the respective elements.

In alternative embodiments of the present disclosures, the drawings can, however, also only serve as a schematic base for the configuration of the crankshaft and the counterweights and different specific shapes, dimensions, and ratios can be selected than shown in the drawings.

The present disclosure can furthermore also be used independently of the form of the counterweights shown in the drawings.

The present disclosure and the described crankshaft can be used in any desired internal combustion engines.

The present disclosure can in this respect be used in V engines. The connecting rods of two cylinders of a V segment can in particular be supported at a crankpin in such an embodiment.

The arrangement of the cranks at the crankshaft can here take place symmetrically with respect to a center plane of the crank or asymmetrically.

The present disclosure can in particular be used with larger engines, for example with engines having at least 12 cylinders. The present disclosure can in particular be used here with engines having 12 cylinders, 16 cylinders, or 20 cylinders. These engines are in particular designed as V engines.

The engine can, for example, be a diesel engine or a gasoline engine.

The engine can be used to drive mobile or stationary machines, for example to drive earthmovers such as excavators or dumper trucks, or for stationary applications such as for engine-generator units to generate electrical power.

The invention claimed is:

1. A crankshaft having:
    at least one counterweight that is screwed to the crankshaft,
    wherein the counterweight has a contact surface at which it contacts a counter-contact surface, and wherein the contact surface extends in a plane that extends in parallel with the axis of the crankshaft; and
    at least two screws by means of which the counterweight is screwed to the crankshaft;
    wherein a position of the counterweight at the crankshaft is fixed via at least a first and a second positioning element independent of the screw connection;
    wherein the first positioning element is arranged in a first plane extending perpendicular to the axis of the crankshaft; and
    wherein the second positioning element is extending in a second plane extending perpendicular to the axis of the crankshaft, the second plane being spaced apart from the first plane in a direction of the axis of the crankshaft.

2. The crankshaft in accordance with claim 1, wherein each positioning element is at least one positioning pin and an associated positioning cutout in which said positioning pin engages.

3. The crankshaft in accordance with claim 1, wherein the at least one positioning element is provided spaced apart from the at least one screw connection.

4. The crankshaft in accordance with claim 1, wherein the positioning pin or pins engage into positioning cutouts that are aligned with one another in the counterweight and in the crankshaft.

5. The crankshaft in accordance with claim 1, wherein the first plane is a center plane of the counterweight extending perpendicular to the axis of the crankshaft and/or a screw connection plane of the counterweight spanned by the longitudinal axes of two screws.

6. The crankshaft in accordance with claim 1, wherein the first and second positioning elements are arranged within the counter-contact surface and/or contact surface.

7. The crankshaft in accordance with claim 1, wherein the first and second positioning elements are each associated with a screw and/or are further spaced apart from one another than the screws.

8. A crankshaft having:
    at least one counterweight that is screwed to the crankshaft; and
    at least two screws by means of which the counterweight is screwed to the crankshaft;
    wherein the counterweight has a contact surface at which it contacts a counter-contact surface;
    wherein a position of the counterweight at the crankshaft is fixed via at least a first and a second positioning element independent of the screw connection;
    wherein the contact surface has at least a first and a second mutually separate contact region that are each associated with one of the two screws, the first and second contact regions being separated by a recess; and
    wherein the first positioning element is arranged in the first contact region and the second positioning element is arranged in the second contact region.

9. The crankshaft in accordance with claim 8, wherein the contact regions respectively completely surround one of the two screws; and/or wherein the screws are each substantially arranged at the center of one of the contact regions.

10. The crankshaft in accordance with claim 8, wherein the contact regions extend in a common plane and/or are arranged symmetrically with respect to a center plane of the counterweight extending in the axial direction of the crankshaft.

11. The crankshaft in accordance with claim 1, wherein the contact surface is produced by cutting machining of a raw part.

12. The crankshaft in accordance with claim 1, wherein the contact surface extends in a plane that extends in parallel with the axis of the crankshaft and/or perpendicular on a center plane of the counterweight extending in an axial direction of the crankshaft.

13. A crankshaft having:
    at least one counterweight, wherein the counterweight has a contact surface at which it contacts a counter-contact surface of the crankshaft;
    two screws by means of which the counterweight is screwed to the crankshaft; and
    two positioning elements that are spaced apart from the screws and by means of which a position of the counterweight at the crankshaft is fixed;
    wherein the spacing between the two positioning elements is greater than the spacing between the two screws.

14. A counterweight for a crankshaft in accordance with claim 1.

15. An internal combustion engine comprising a crankshaft in accordance with claim 1.

16. A machine having an internal combustion engine in accordance with claim 15.

17. A counterweight for the crankshaft in accordance with claim 8.

18. A counterweight for the crankshaft in accordance with claim 13.

19. The crankshaft in accordance with claim 1, wherein a spacing between the first and second positioning elements is greater than a spacing between the two screws.

* * * * *